United States Patent
Smith, III

(10) Patent No.: US 7,883,125 B2
(45) Date of Patent: Feb. 8, 2011

(54) LOCKING MECHANISMS

(75) Inventor: Reese Randolph Smith, III, Succasunna, NJ (US)

(73) Assignee: Smiths Group PLC, London (GB)

( * ) Notice: Subject to any disclaimer, the term of this patent is extended or adjusted under 35 U.S.C. 154(b) by 1001 days.

(21) Appl. No.: 10/563,602

(22) PCT Filed: Jul. 2, 2004

(86) PCT No.: PCT/GB2004/002890

§ 371 (c)(1),
(2), (4) Date: Feb. 1, 2006

(87) PCT Pub. No.: WO2005/005252

PCT Pub. Date: Jan. 20, 2005

(65) Prior Publication Data

US 2006/0163426 A1    Jul. 27, 2006

(30) Foreign Application Priority Data

Jul. 8, 2003  (GB) .................................. 3159415

(51) Int. Cl.
*E05C 3/06*    (2006.01)
(52) U.S. Cl. .................. 292/216; 292/201; 292/DIG. 23
(58) Field of Classification Search .................. 292/216, 292/201, DIG. 23, 197; 244/102 SI, 102 A; 49/280

See application file for complete search history.

(56) References Cited

U.S. PATENT DOCUMENTS

| | | | | |
|---|---|---|---|---|
| 2,881,021 A | * | 4/1959 | Jacobson | 292/229 |
| 3,504,406 A | * | 4/1970 | Schott | 24/603 |
| 4,979,384 A | | 12/1990 | Malesko et al. | |
| 5,288,037 A | * | 2/1994 | Derrien | 244/102 SL |
| 6,474,704 B1 | | 11/2002 | Rathmann et al. | |
| 6,811,118 B2 | * | 11/2004 | Collet et al. | 244/102 SL |
| 7,261,338 B2 | * | 8/2007 | Spurr | 292/216 |

FOREIGN PATENT DOCUMENTS

| | | |
|---|---|---|
| DE | 44 05 547 A | 8/1995 |
| EP | 0 978 609 A | 2/2000 |
| EP | 1 342 663 A | 9/2003 |

* cited by examiner

*Primary Examiner*—Carlos Lugo
*Assistant Examiner*—Mark Williams
(74) *Attorney, Agent, or Firm*—William Scott Andes, Esq.; Armstrong Teasdale LLP

(57) ABSTRACT

A locking mechanism for aircraft landing gear has a hook (3) displaceable into and out of engagement with the landing gear capture pin (1). A roller (45) on a latch arm (40) engages a part (36) of the hook (3) to prevent it moving from a position where the pin (1) is retained. A linear solenoid (50) and a motor-driven rotatable cam (63) can both be operated independently to move the roller (45) out of engagement with the hook (3) and thereby allow a spring (35) to rotate the hook and release the capture pin (1).

10 Claims, 2 Drawing Sheets

LOCKING MECHANISMS

This invention relates to locking mechanisms of the kind for engaging and retaining a movable member.

The invention is more particularly, but not exclusively, concerned with mechanisms for locking aircraft landing gear in their retracted position.

Aircraft landing gear and doors are held up by means of a pivoted hook mounted within the undercarriage bay and arranged to engage a capture pin on the landing gear or doors. A lock holds the hook in the engaged position. Conventional uplock mechanisms have an hydraulic actuator that releases the lock and allows the hook to rotate out of engagement with the pin when the landing gear is to be lowered. In the event the hydraulic actuator fails, the pilot can release the lock by pulling a lever connected to one end of a cable connected to the lock. This provides a secondary, emergency release mechanism.

In large aircraft it can be very difficult to provide a mechanical interconnection between the flight deck and the landing gear bay, because of the distances involved.

It is an object of the present invention to provide alternative locking mechanisms.

According to the present invention there is provided a locking mechanism of the above-specified kind, characterised in that the mechanism includes a hook member mounted for angular displacement about a first axis such that the hook member is movable into and out of retaining engagement with the movable member, a latch member mounted for angular displacement about a second axis parallel with the first axis, the latch member having a portion thereof spaced from the second axis, which can be located to prevent movement of the hook member out of retaining engagement, and first and second actuators operable to rotate the latch member about the second axis such that the portion is movable to a position where it does not prevent movement of the hook member out of retaining engagement, and that the second actuator is a rotary actuator and includes a cam arranged for rotation about a third axis parallel to the second axis and located to engage a part of the latch member.

The part engageable by the cam is preferably the portion spaced from the second axis. The first actuator preferably includes a solenoid and the second actuator preferably includes an electric motor. The mechanism may include a spring connected to the hook member to urge it out of retaining engagement with the movable member. The spring is preferably connected between the hook member and the latch member so as to urge the portion of the latch member into engagement with the hook member. The hook member may have a hook formation on one side of the first axis and be engaged by the portion of the latch member on an opposite side of the first axis. The portion of the latch member is preferably a roller. The mechanism may include a sensor responsive to the position of the latch member. The movable member is preferably a capture pin of aircraft landing gear.

An aircraft undercarriage locking mechanism will now be described, by way of example, with reference to the accompanying drawings, in which.

Figure 1:
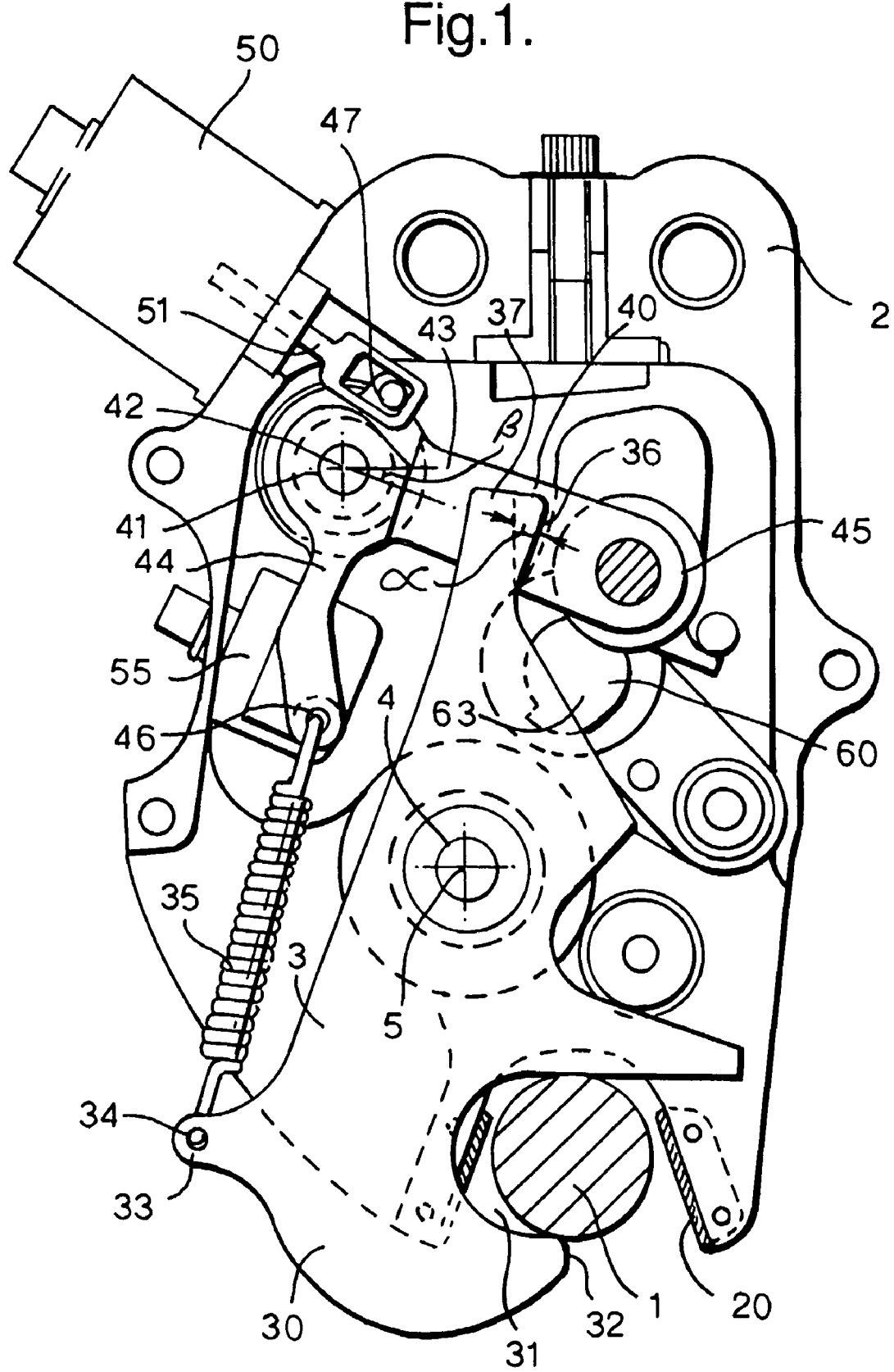
FIG. 1 is a side elevation view of the mechanism.

The locking mechanism, or uplock, is mounted within the landing gear bay of an aircraft and, in the position shown in FIG. 1, is locked onto a capture pin 1 attached to the aircraft landing gear or to the landing gear doors. The mechanism is arranged to hold the landing gear and doors in the retracted, up, position until released.

The mechanism has a metal mounting plate 2 with an inverted V shape opening 20 at its lower end in which the capture pin 1 is received. The mechanism includes a hook 3 in the form of a generally elongate plate oriented parallel to the mounting plate 2. The hook 3 is mounted on the mounting plate 2 by a bearing 4 approximately midway along the length of the hook, so that it can be angularly displaced about an axis 5 normal to the mounting plate. The lower end 30 of the hook 3 has a slot 31 open on its right-hand side and shaped to receive the capture pin 1. The slot 31 overlies the opening 20 in the mounting plate 2, with the lower edge 32 of the slot projecting substantially midway across the opening, in the locked position, so that the pin 1 cannot be withdrawn. On the left-hand side, level with the slot 31, the hook 3 is formed with a small, laterally-extending finger 33 having an opening 34 in which is secured one end of a helical spring 35. The spring 35 is tensioned to provide a force urging the hook 3 in a clockwise sense about the axis 5, that is, tending to pull the lower end 30 of the hook to the left away from the opening 20. The upper end 37 of the hook 3 has a contact surface 36 facing to the right and inclined down at an angle $\alpha$ of about 25° to the vertical. Engagement with this surface 36 prevents clockwise rotation of the hook 3.

A latch arm or clevis 40 is mounted towards the upper end of the mounting plate 20 by a bearing 41 for rotation about an axis 42 parallel with the hook rotation axis 5. The latch arm 40 is of generally dog-leg shape having two limbs 43 and 44 extending at right angles to one another, with the bearing 41 located at the juncture between the limbs. One limb 43 extends to the right and down beneath the upper end 37 of the hook 3, at an angle $\beta$ to the horizontal slightly less than the angle $\alpha$. At its free end, the limb 43 carries a roller 45 on its rearwardly facing surface. The roller 45 locates to the right of and adjacent the contact surface 36 of the hook 3. In the position shown in FIG. 1, the roller 45 limits the extent of clockwise rotation of the hook 3 and prevents it being rotated sufficiently to enable the capture pin 1 to be withdrawn from the opening 20. The geometry of the angle $\alpha$ of the contact surface 36 and the angle $\beta$ of the limb 43 are such as to ensure that force applied by the contact surface to the roller 45 only tends to rotate the limb 43 further clockwise into engagement with the hook.

The other limb 44 of the latch arm 40 extends generally down and to the left and is bent at its lower end towards the hook 3. An aperture 46 at the end of the limb 44 retains the upper end of the spring 35 so that the spring exerts a force on the latch arm 40 tending to rotate it clockwise.

The latch arm 40 also has a small lateral extension 47 from its upper edge in the region of the bearing 41. A linear solenoid actuator 50 fixed with the mounting plate 2 has a plunger 51 connected to this extension 47. The natural, rest position of the actuator plunger 51 is extended, as shown, with the latch arm 40 in its locked, clockwise position. When the actuator 50 is energized, its plunger 51 is pulled in causing the latch arm 40 to rotate about the axis 42 in an anticlockwise sense and against the action of the spring 35. When the actuator 50 is fully retracted, the latch arm 40 is rotated sufficiently to lift the roller 45 clear of the upper end 33 of the hook 3. The hook 3 is now free to be rotated clockwise by the spring 35 out of retaining engagement with the capture pin 1 so that this can be withdrawn from the opening 20. In this position, therefore, the mechanism is unlocked.

A microswitch or similar sensor 55 is secured with the mounting plate 20 adjacent the left-hand side of the lower limb 44 so that the switch is engaged by this limb when the latch arm 40 is in its locking position. When the latch arm 40 is rotated anticlockwise to release the hook 3, the limb 44 disengages the switch 55 and causes its output to change, thereby giving an output indication to the pilot that the locking mechanism has been released.

The locking mechanism includes an additional actuator 60 for use in the event of a failure of the main actuator 50.

Figure 2:
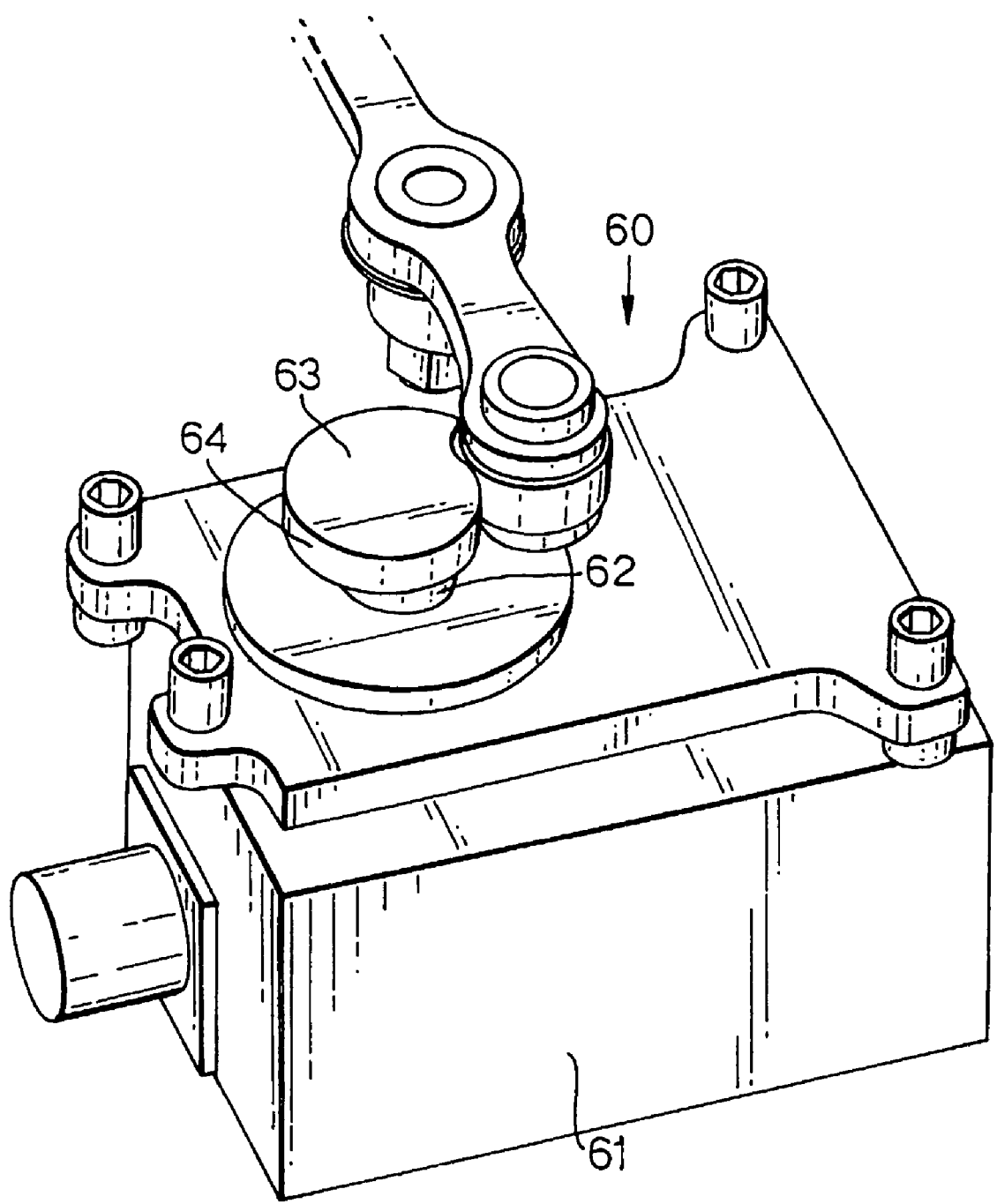
FIG. 2 is a perspective view of a part of the locking mechanism.

The additional actuator 60 is most clearly seen in FIG. 2. This takes the form of a rotary electric actuator having a motor 61 with an output shaft 62 extending parallel to the axes 5 and 42. The shaft 62 supports a radially-extending cam plate 63 having a peripheral cam surface 64 around its circumference. The cam plate 63 is located behind the hook 3 and contacts the edge of the roller 45 when the latch arm 40 is in its locked state. It will be appreciated that the cam plate 63 does not in any way impede unlocking, anticlockwise rotation of the latch arm 40. In its normal, unactuated state, the rotary actuator 60 has its cam plate 63 oriented such that the shortest radial distance of the cam surface 64 is presented to the roller 45. This thereby ensures that, the latch arm 40 can be rotated fully into locking engagement with the hook 3. If, however, the main actuator 50 were to fail, the pilot would actuate the auxiliary actuator 60 by supplying power to rotate the motor 61 and hence the cam plate 63 in an anticlockwise direction. As the plate 63 rotates there is a gradual increase in the radial distance between the cam axis and the part of the cam surface 64 contacting the roller 45. This pushes the roller 45 up, rotating the latch arm 40 anticlockwise until, when fully rotated, the arm has been displaced sufficiently to clear the upper end 33 of the hook 3 and allow it to rotate clockwise. This releases the capture pin 1 and allows the landing gear to extend.

The rotary cam actuator enables a relatively high force to be applied by a relatively compact, simple arrangement. This provides a reliable mechanism without excessive bulk and weight.

It will be appreciated that although the present invention is particularly suited to an aircraft landing gear uplock it could also be used in other applications.

The invention could be modified in various ways. For example, the main, linear actuator need not be an electrical solenoid actuator but could be an hydraulic actuator.

The invention claimed is:

1. A locking mechanism for engaging and retaining a movable member, wherein the mechanism includes a hook member mounted for angular displacement about a first axis such that the hook member is movable into and out of retaining engagement with the movable member, a latch member mounted for angular displacement about a second axis parallel with the first axis, the latch member having a portion thereof spaced from the second axis, which can be located to prevent movement of the hook member out of retaining engagement with the movable member, and first and second actuators each operable to rotate the latch member about the second axis such that the portion is movable to a position where it does not prevent movement of the hook member out of retaining engagement with the movable member, and that the second actuator is a rotary actuator for use in case of failure of the first actuator, the second actuator includes a cam arranged for rotation about a third axis parallel to the second axis and to the first axis located to engage a part of the latch member, wherein the cam includes a peripheral cam surface engageable with the part of the latch member such that a radial distance between the third axis and the cam surface engaged with the part of the latch member increases as the cam is rotated by the rotary actuator, and wherein the hook member includes an angled contact surface configured to contact the portion of the latch member such that a force applied by the contact surface to the portion of the latch member rotates the portion into engagement with the hook member and limits a rotation of the hook member.

2. A locking mechanism according to claim 1, wherein the part engageable by the cam is the portion spaced from the second axis.

3. A locking mechanism according to claim 1, wherein the first actuator includes a solenoid.

4. A locking mechanism according to claim 1, wherein the second actuator includes an electric motor.

5. A locking mechanism according to claim 1, wherein the mechanism includes a spring connected to the hook member to urge it out of retaining engagement with the movable member.

6. A locking mechanism according to claim 5, wherein the spring is connected between the hook member and the latch member so as to urge the portion of the latch member into engagement with the hook member.

7. A locking mechanism according to claim 1, wherein the hook member has a hook formation on one side of the first axis and that it is engaged by the portion of the latch member on an opposite side of the first axis.

8. A locking mechanism according to claim 1, wherein the portion of the latch member is a roller.

9. A locking mechanism according to claim 1, wherein the mechanism includes a sensor responsive to the position of the latch member.

10. A locking mechanism according to claim 1, wherein the movable member is a capture pin of aircraft landing gear.

* * * * *